US005711351A

United States Patent [19]
Wheatley

[11] Patent Number: 5,711,351

[45] Date of Patent: Jan. 27, 1998

[54] FORMING OPENINGS IN PIPES

[76] Inventor: Douglas John Wheatley, Hudson Hill, Hedingham Road, Wethersfield, Braintree, United Kingdom

[21] Appl. No.: 432,208

[22] PCT Filed: Nov. 11, 1993

[86] PCT No.: PCT/GB93/02323

§ 371 Date: May 11, 1995

§ 102(e) Date: May 11, 1995

[87] PCT Pub. No.: WO94/11130

PCT Pub. Date: May 26, 1994

[30] Foreign Application Priority Data

Nov. 12, 1992 [GB] United Kingdom .................. 92 23686

[51] Int. Cl.[6] .............................. F16L 55/18; B21B 17/02

[52] U.S. Cl. .............................. 138/97; 138/98; 138/114; 72/370; 264/36

[58] Field of Search .............................. 138/89, 97, 98, 138/111, 114; 72/325, 326, 332, 337, 370; 156/287; 264/36, 269

[56] References Cited

U.S. PATENT DOCUMENTS

| | | | |
|---|---|---|---|
| 4,052,880 | 10/1977 | Cullinan et al. | 72/326 |
| 4,440,339 | 4/1984 | Tamai et al. | 138/97 X |
| 4,505,017 | 3/1985 | Schukei | 138/97 X |
| 4,547,944 | 10/1985 | Hayden | 138/97 X |
| 4,592,391 | 6/1986 | Wentzell | 138/97 X |
| 4,807,675 | 2/1989 | Sharp | 138/89 X |
| 4,844,322 | 7/1989 | Flowers et al. | 138/97 X |
| 5,267,279 | 11/1993 | Saito et al. | 138/97 X |

*Primary Examiner*—Patrick Brinson
*Attorney, Agent, or Firm*—Andrus,Sceales,Starke & Sawall

[57] ABSTRACT

Apparatus for forming an opening in a pipe from the interior thereof comprises a hydraulic ram having a cylinder within which slides a piston rod. A sharpened wedge-shaped tool is mounted in the free end of the piston rod, and the end of the cylinder remote from the tool has a rounded profile similar to that of the pipe to be cut. The cylinder is affixed to a carrier tube with the axis of the tube at right-angles to that of the tube. Using the tool, it is possible to cut an opening through a pipe extending within a tank which may contain combustible or explosive liquids or vapors, without risk of heat, sparks or the generation of swarf. As such, a replacement fill-pipe containing an anti-over-fill valve may be fitted to an existing fill-pipe of a petrol tank without the need to open the tank.

3 Claims, 3 Drawing Sheets

FORMING OPENINGS IN PIPES

This invention relates to a method of forming an opening through the wall of a pipe, and also to a tool for forming such an opening. The invention further relates to a method of fitting a replacement fill-pipe into an existing fill-pipe of a tank, such as of an underground tank containing a flammable and volatile liquid—for example, petrol.

A common form of petrol tank comprises a steel (but sometimes reinforced plastic) vessel buried below ground level and having an upstanding neck provided on the top thereof, with an outwardly directed flange. The tank is closed by means of a lid Which fits over the neck opening and is bolted to the flange in a liquid and gas-tight manner. Pipes for filling and drawing liquid from the tank, along with other services such a level indicator, pass through the lid and are connected to appropriate pipework and so on within a chamber in the ground above the lid, which chamber is conventionally closed by a man-hole cover.

In one common kind of arrangement for such a tank, the lid is made of steel and has a circular opening therethrough in which is welded a steel sleeve having upper and lower internal threads. The fill-pipe itself may have external threads which are engaged with the lower threads of the sleeve, to project downwardly into the tank from the lid. Above the lid, appropriate pipe-work is provided to allow the filling of the tank, through the sleeve and fill-pipe.

In the case of a below-ground garage forecourt tank intended to hold petrol, the opening of the tank by removing the tank lid has to be performed with great caution and special measures have to be taken in order to avoid the risk of fire and explosion. Generally speaking, this may be performed only once appropriate notice has been given to the local government authority. The tank must be emptied of all petrol, and is then filled with water to displace all petrol fumes and vapours. The above-lid pipework and other services have to be disconnected from the lid, and then the ring of bolts around the lid may be removed. Once done, the lid may be lifted together with the fill-pipe projecting downwardly therefrom. After the lid has been re-fitted to the tank, the tank has to be subjected to a pressure test, in order to ensure that a perfect seal has been formed between the tank lid and the neck flange. Once tested, the pipework and services are re-made to the tank lid, and then the tank has to be completely drained of water, before it can be placed back in service. Moreover, the water will be contaminated and so has to be disposed of with considerable care. It will be appreciated that the above procedures take a most considerable time and may be performed only by skilled personnel; a tank typically is out of service for one to three days if the lid has to be removed, for any reason.

In order to minimise the likelihood of environmental pollution, many local government authorities are now insisting on underground tanks used for petrol or other noxious fluids to be provided with an automatic anti-over-fill valve, to close off the fill-pipe when the liquid in the tank reaches a predetermined level. To do this, a simple existing fill-pipe must be removed and replaced by another fill-pipe having an anti-over-fill valve assembly installed at an appropriate location along the length of that pipe.

In our earlier British Patent Publication No. 2,255,382, we have proposed a method for changing a fill-pipe without the need to remove a tank lid, but this method can be used only in an assembly where a fill-pipe is welded to an externally threaded nipple which is in turn inter-engaged with the threads of a sleeve welded to the tank lid. That method cannot however be used where the fill-pipe is threaded directly into the sleeve, as has been described above. In this case, it has been necessary to remove the tank lid, unscrew the existing fill-pipe from the sleeve in the lid, screw in the replacement pipe, and then replace the lid. For the reasons discussed above, this is a time-consuming and expensive procedure.

It has been recognised that it might be possible to fit a replacement fill-pipe with an anti-over-fill valve into the existing fill-pipe, but this has been found not to work since it is necessary for the replacement fill-pipe to be vented to the tank interior in the region of the anti-over-fill valve. If such a replacement fill-pipe is fitted into an existing fill-pipe, there will be a closed annular volume between the two fill-pipes, the pressure within which will depend upon the fluid level within the tank.

To overcome the above problem, openings would have to be formed through the existing fill-pipe, in the region of its upper end. Unfortunately, holes cannot be drilled through the existing fill-pipe using conventional drilling equipment, firstly because access is severely restricted and can be gained solely through the sleeve of the tank lid, and secondly because of the risk of explosion should conventional drilling equipment be employed. The resultant swarf could also be a problem. It is therefore a principal aim of the present invention to provide both a method of and apparatus for forming at least one opening through a pipe, from the interior thereof, in such a way as to minimise the likelihood of the generation of sparks or heat, thereby to minimise the risk of fire or explosion when working in the vicinity of flammable vapours.

According to one aspect of the present invention, there is provided a method of forming an opening through the wall of a pipe, comprising locating within the pipe an expandable ram so that the axis of the ram extends substantially transversely of the pipe, the ram having on at least one end thereof a cutting tool, and expanding the ram so as to cause the cutting tool to engage the inner wall of the pipe with the other end of the ram engaging the inner wall of the pipe at an opposed location, and continuing the expansion of the ram to force the cutting tool through the pipe wall, with the reaction to the cutting force being provided by the engagement of said other end of the ram with said opposed location of the pipe wall.

In the method of this invention, an opening can be formed through the upper region of a fill-pipe of an underground petrol tank, without removing the tank lid, and also without emptying the tank. Once done, the fitting of a replacement fill-pipe having an anti-over-fill valve into the existing pipe becomes a possibility, so greatly reducing the costs associated with this. As the cutting procedure is in effect a shearing operation performed relatively slowly and gradually there is essentially no risk of sparks, permitting safe operation despite the presence of flammable vapours.

The cutting tool may be shaped progressively to sever the material defining an area of the pipe wall and to deflect the severed material outwardly as the cutting progresses. In this way, the severed material may remain connected to the pipe, but displaced outwardly from its original position. This prevents the production of swarf, but the displaced material does not hinder the subsequent fitting of a replacement fill-pipe into the original fill-pipe.

According to a second aspect of this invention, there is provided a method of fitting a replacement fill-pipe into an existing fill-pipe projecting downwardly into a tank, comprising forming at least one opening through the wall of the existing fill-pipe adjacent the upper end thereof using the method of this invention as described above, lowering the replacement fill-pipe having an anti-over-fill valve into the existing fill-pipe, and securing the replacement fill-pipe in position, from the upper end of thereof. The anti-over-fill valve of the replacement fill-pipe may operate normally when installed in this way, as the annular space between the original and replacement fill-pipes is ventilated to the tank interior, so preventing pressure build-up in that space. If required, more than one opening may be formed through the existing fill-pipe, by repeated use of the tool, to ensure adequate venting even with high fill-rates.

According to yet another aspect of this invention, there is provided a tool for forming an opening through the wall of a pipe from the pipe interior comprising an expandable ram having a cutting tool mounted on one axial end of the ram, a reaction face on the opposed end of the ram, and means to supply fluid under pressure to the ram to cause the expansion thereof, the cutting tool being shaped progressively to cut an area of the pipe wall from the inside thereof upon expansion of the ram following the location of the ram transversely across the pipe.

Preferably, the cutting tool is generally wedge-shaped, and may be of a substantially circular cross-sectional shape. However, other designs of cutting tool could be used, progressively to cut material from the pipe wall, whilst leaving that material still attached but deflected outwardly of the pipe.

The other end of the ram may have a rounded profile for engaging the inner wall of a cylindrical pipe. For example, said other end may have a part-spherical profile, or a part-cylindrical profile, the axis of the cylinder lying at right-angles to the axis of the ram.

Advantageously, the ram is mounted on an elongate carrier, the axis of which extends at right angles to the ram axis, whereby the ram may suitably be positioned in the pipe. Hydraulic fluid pipes may lead to and from the ram through such a carrier, whereby they are protected against damage.

Though a power driven source of pressurised hydraulic fluid could be employed, it is preferred for there to be a simple hand-pump for hydraulic fluid. This avoids the need to spark-proof the power-driven source when the tool is to be used to cut an opening in a fill-pipe, and moreover ensures optimum portability, for use in confined spaces.

By way of example only, one specific embodiment of this invention will now be described in connection with the piercing of a petrol tank fill-pipe to form an opening therethrough adjacent its upper end, reference being made to the accompanying drawings, in which.

Figure 2:
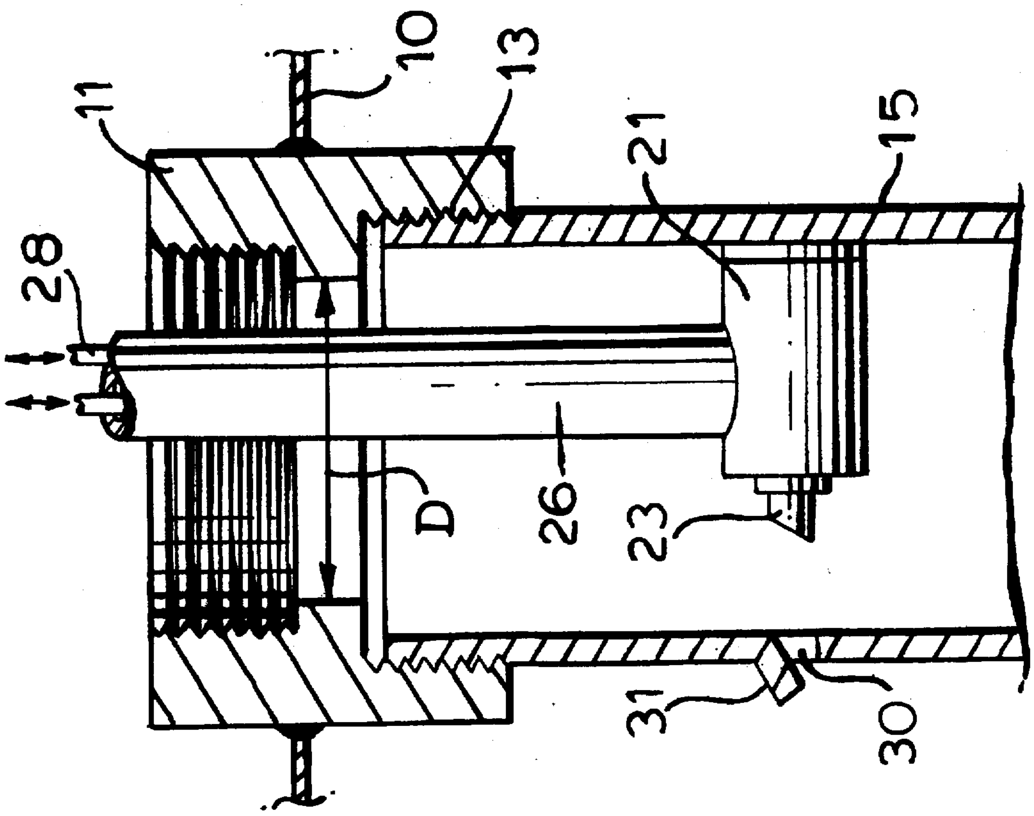
FIG. 2 is a view similar to that of FIG. 1, but following completion of the opening and with the tool fully retracted ready for removal.
Figure 1:
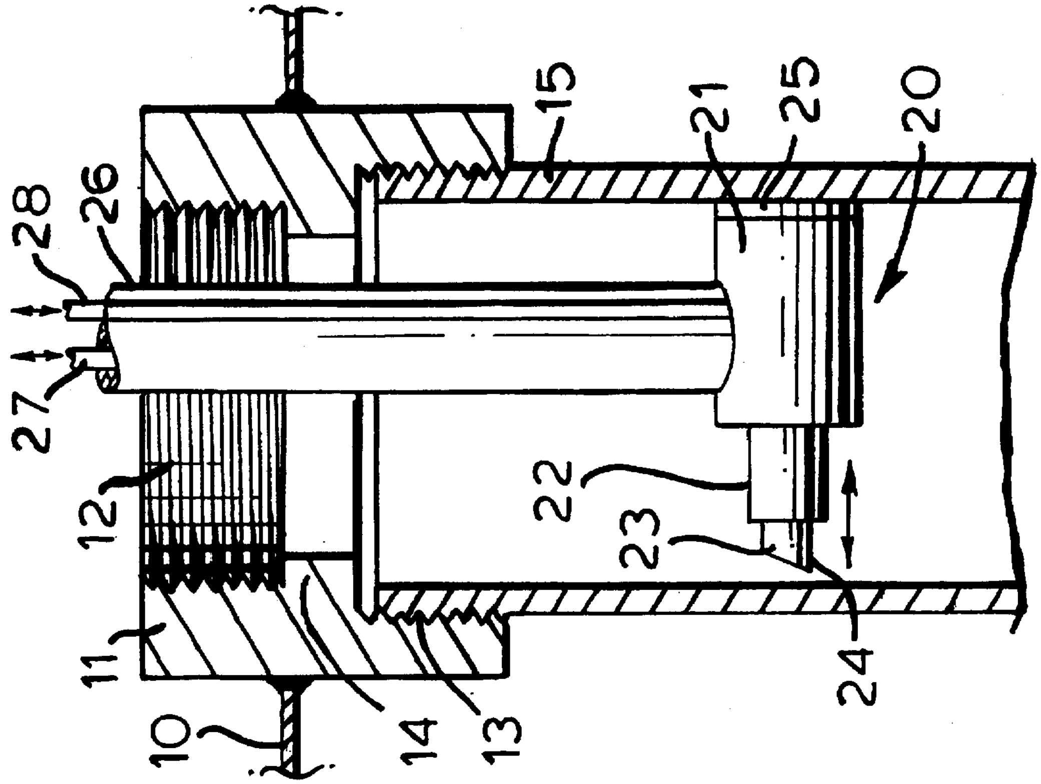
FIG. 1 is a vertical part-sectional view through the upper region of a fill-pipe, with a tool of this invention positioned therewithin, ready for performing the method of this invention.

Referring initially to FIGS. 1 and 2, there is shown part of a lid 10 of an underground petrol tank, which lid is of generally circular shape and is provided with a ring of peripheral holes, by means of which the lid may be is bolted to a flange (not shown) of an upstanding neck (also not shown) of the petrol tank. Welded into a hole formed in the lid 10 is a sleeve 11, which sleeve is provided with upper and lower internal threads 12 and 13, an internal shoulder 14 being formed therebetween—though in some arrangements no such shoulder exists and the threads are continuous, all the way through the sleeve. Prior to the lid 10 being fitted to a tank, a fill-pipe 15 having external threads at its upper end is screw-threaded into the lower threads 13 of the sleeve 11. When the lid has been fitted to the tank, appropriate pipe-work for filling of the tank is connected to the sleeve 11, using the upper threads 12.

Figure 4:
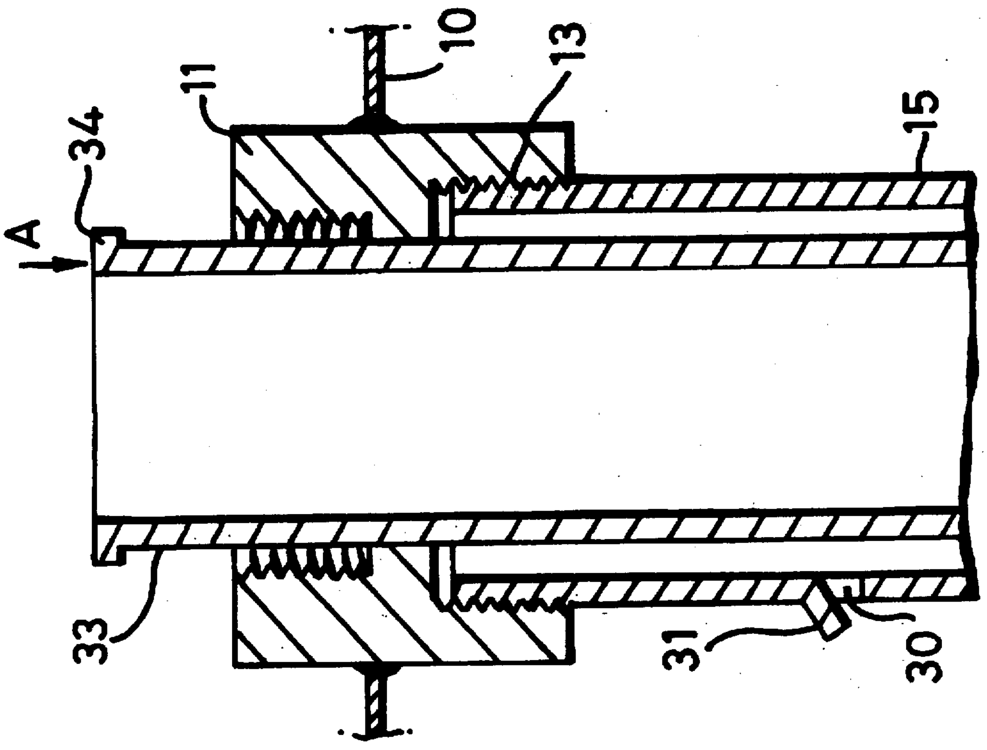
FIG. 4 is a view similar to that of FIG. 2 but after removal of the tool and showing the insertion of a replacement fill-pipe.

If the tank is to be fitted with an anti-over-fill valve, the lid 10 must be removed so that the fill-pipe may be replaced by another fill-pipe appropriately furnished with an anti-over-fill valve. Alternatively, a replacement fill-pipe including an anti-over-fill valve may be fitted into the existing fill-pipe 15 from above the lid. However, in this case the existing fill-pipe 15 must be formed with at least one opening through its wall adjacent the sleeve 11, to vent the annular space between the existing fill-pipe 15 and the replacement fill-pipe 33 (FIG. 4) when fitted thereinto. The method, and tool, of this invention allow this to be achieved.

Figure 3:
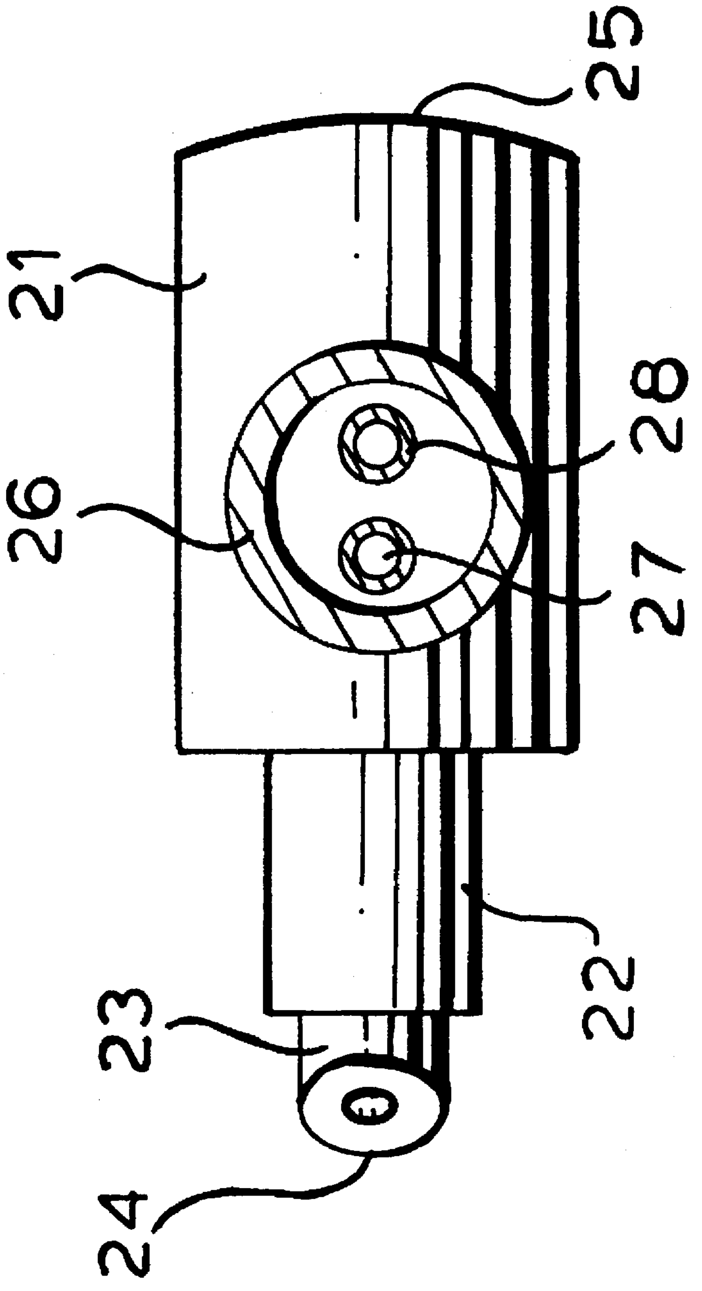
FIG. 3 is a plan view of the tool illustrated in FIGS. 1 and 2.
Figure 5:
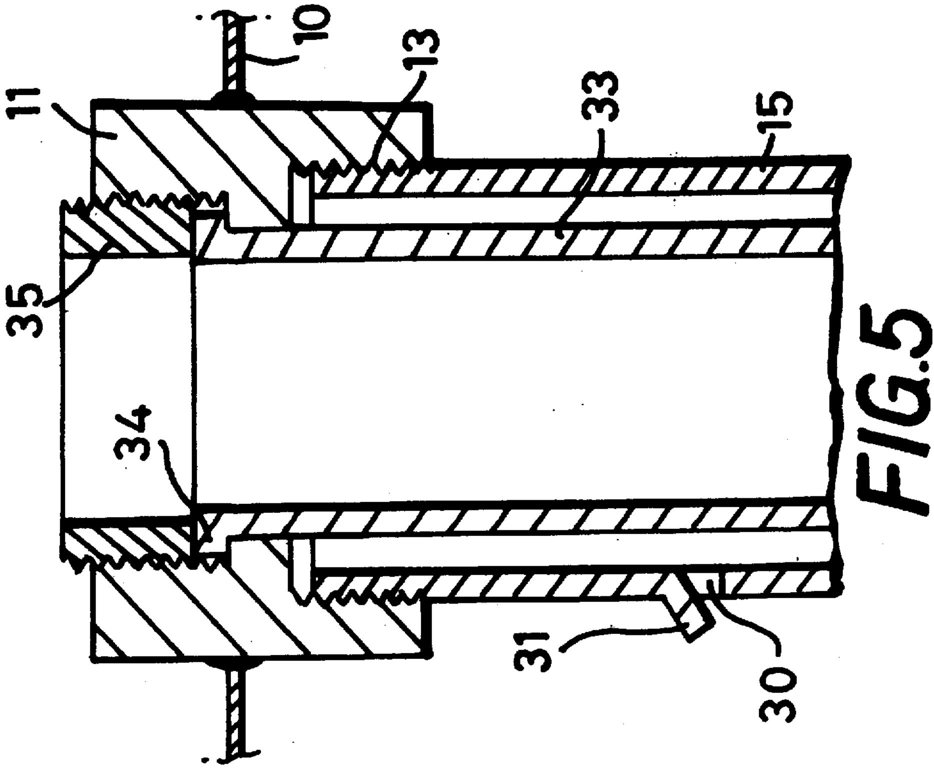
FIG. 5 shows the replacement fill-pipe secured in position within the existing fill-pipe.

Shown in FIGS. 1 to 3 is the tool of this invention, comprising an hydraulic ram 20 having a cylinder 21 and a piston rod 22 slidable along the ram axis, appropriate seals being provided between the piston rod 22 and the cylinder 21. The free end of the piston rod 22 is furnished with a tool-steel cutter 23, of circular cross-sectional shape and having a wedge-shaped leading edge 24. The cutter 23 is provided with a central bore, through which a hardened Allen-type screw extends and which latter is screw-threaded into a bore (not shown) formed in the piston rod, whereby the cutter may be removed and replaced by a cutter of a different size or by a sharp cutter, whenever required. The end of the cylinder 21 remote from the piston rod 22 is furnished with a rounded profile 25, preferably of cylindrical form, suitable for engaging the inner wall of the fill-pipe.

A carrier tube 26 is secured to the cylinder 21, with the axis of that tube 26 extending parallel to the axis of the cylindrical surface 25 of the cylinder 21. Pipes 27 and 28 extend through the tube 26, for the feeding of hydraulic fluid under pressure to the cylinder 21, and for the draining of hydraulic fluid therefrom. Conveniently, a hand-operated pump for hydraulic fluid is connected to the pipes 27 and 28 to allow expansion and contraction of the ram, as required. The pipes 27 and 28 could be external of the tube 26, depending upon the respective diameters.

To use the tool described above, the piston rod 22 is fully retracted into the cylinder 21. In this condition, the overall length of the ram 20 and cutter 23, parallel to the ram axis, is less than the internal diameter D of the shoulder 14 within the sleeve 11. As such, the ram 20 may be lowered through the sleeve 11, using the tube 26 to guide the ram 20, until the ram lies within the original fill-pipe 15, below the sleeve 15 and extending generally diametrically of the fill-pipe 15. The ram may then be expanded by supplying hydraulic fluid under pressure thereto, until the cutter 23 contacts the inner wall of the pipe 15, and the rounded profile 25 of the cylinder 21 also contacts the pipe 15, at an opposed location. Continuing the supply of hydraulic fluid under pressure to the cylinder 21 will then force the cutter 23 to start cutting through the pipe 15, which action is continued until a portion of the pipe wall has been severed by the cutter 23 and forced outwardly, as shown in FIG. 2. This leaves an opening 30 through the pipe wall, but with an outwardly-projecting lug 31 still connected to the pipe.

Once the opening through the pipe wall has been formed as described above, the ram 20 is fully contracted, so reducing the overall length to less than the internal diameter of the shoulder 14 and permitting the removal of the ram 20 from within the pipe 15. Alternatively, further openings may be formed through the pipe 15, at arcuately spaced intervals, whereafter the tool may be removed.

Once the pipe 15 has been furnished with sufficient apertures to allow the free flow of air to and from the interior of the pipe 15, a replacement fill-pipe 33 having both an anti-over-fill valve (not shown) and an outwardly directed lip 34 at its upper end, may be lowered is the direction of arrow A into the existing fill-pipe 15, so that the lip bears on the upper surface of the shoulder 14. Thereafter, the replacement fill-pipe may be clamped in position by a nipple 35 screwed down into the upper threads of the sleeve 11. In the alternative, such a nipple may be screwed into the sleeve 11 before fitting of the replacement fill-pipe, the replacement fill-pipe then sealing against an appropriate surface of the nipple. In either case, the original fill-pipe work may be connected to the assembly once the replacement fill-pipe has been fitted into the original pipe 15.

The venting of the original fill-pipe 15 to the interior of the tank allows proper operation of the anti-over-fill valve in the replacement fill-pipe. The cutting operation for the vents is performed in a safe manner, with essentially no risk of the generation of sparks, and without creating swarf or other metal pieces or particles which might otherwise contaminate fluid within the tank. The operation may be performed quickly, safely and reliably, and without the need to open the tank, and all that that entails.

I claim:

1. A method of fitting a replacement fill-pipe into an existing fill-pipe projecting downwardly into a tank, comprising:

forming at least one opening through the wall of the existing fill-pipe adjacent the upper end thereof by means of a method comprising the steps of:

locating within the existing fill-pipe an expandable ram so that the axis of the ram extends substantially transversely of the existing fill-pipe, the ram having on at least one end thereof a cutting tool;

and expanding the ram so as to cause the cutting tool to engage the inner wall of the pipe with the other end of the ram engaging the inner wall of the pipe at an opposed location;

continuing the expansion of the ram to force the cutting tool through the pipe wall, with the reaction to the cutting force being provided by the engagement of said other end of the ram with said opposed location of the pipe wall;

whereafter the method comprises the further steps of:

removing the ram from the existing fill-pipe;

lowering the replacement fill-pipe axially into the existing fill-pipe; and securing the replacement fill-pipe in position, from the upper end of the replacement fill-pipe.

2. A method as claimed in claim 1, wherein the cutting tool is shaped progressively to sever the material defining an area of the pipe wall and to deflect the severed material outwardly as the cutting progresses.

3. A method as claimed in claim 2, wherein at the completion of the cutting step a portion of the pipe wall remains connected to the pipe, but displaced from its original position.

* * * * *